Dec. 21, 1965 T. H. CLARK 3,225,342

SHIFT REGISTER WITH MEANS FOR DISPLAYING STORED INFORMATION

Filed July 1, 1959 4 Sheets-Sheet 1

INVENTOR
Thomas Harold Clark
BY
[signature]
ATTORNEY

Dec. 21, 1965 T. H. CLARK 3,225,342

SHIFT REGISTER WITH MEANS FOR DISPLAYING STORED INFORMATION

Filed July 1, 1959 4 Sheets-Sheet 2

INVENTOR
Thomas Harold Clark
BY
ATTORNEY

INVENTOR
Thomas Harald Clark
BY
[signature]
ATTORNEY

SHIFT REGISTER WITH MEANS FOR DISPLAYING STORED INFORMATION

Filed July 1, 1959 4 Sheets-Sheet 4

INVENTOR
Thomas Harold Clark
BY
ATTORNEY

United States Patent Office 3,225,342
Patented Dec. 21, 1965

3,225,342

SHIFT REGISTER WITH MEANS FOR DISPLAYING STORED INFORMATION

Thomas Harold Clark, Taplow Court, Taplow, England, assignor to British Telecommunications Research Limited, Taplow, England, a British company Filed July 1, 1959, Ser. No. 824,363
Claims priority, application Great Britain, July 4, 1958, 21,522/58
6 Claims. (Cl. 340—324)

Figure 1:
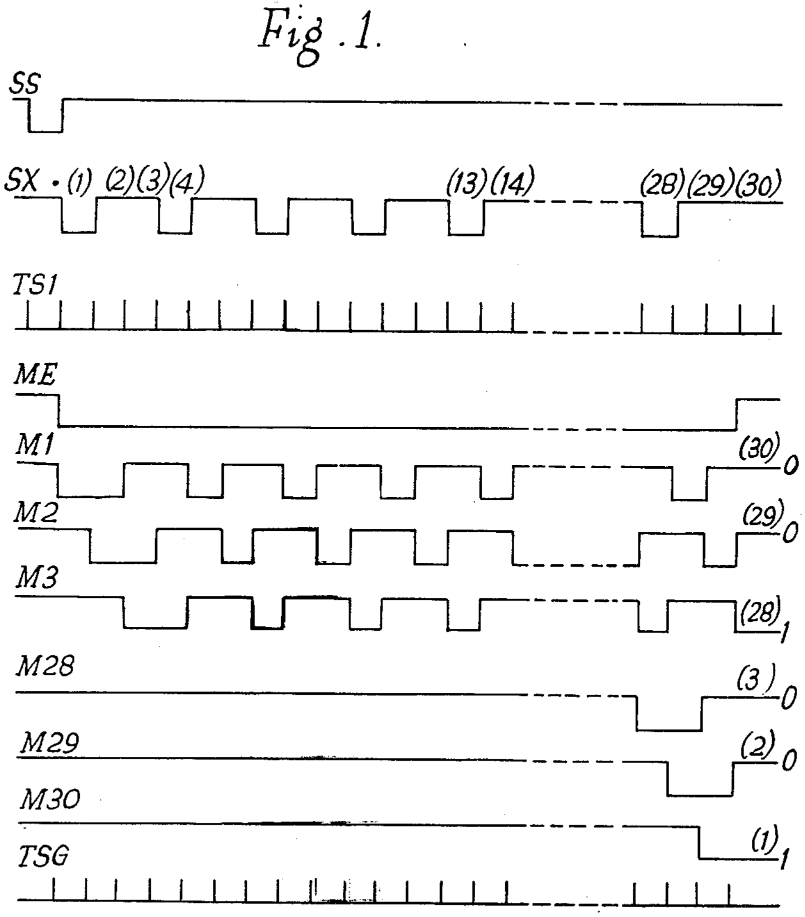

The present invention relates to display equipment for electrical waveforms and is particularly concerned with the type of waveform which is used in connection with or may be derived from a storage device of the magnetic drum type. Such devices now find increasing application in a number of fields, particularly for the storage of binary information, which may conveniently be done by arranging that one binary value is represented by reversal of the direction of magnetization in one sense e.g. positive to negative at substantially the middle of a storage element while the other binary value is represented by reversal in the opposite direction e.g. negative to positive.

In the setting up and maintenance of magnetic drums of this type, it is found desirable to be able to obtain readily an indication of the information already stored on a particular track. This information can be obtained in the form of a trace on a cathode ray tube but some complications are involved in securing a display which is sufficiently permanent and easy to interpret and the invention is concerned with providing a simple circuit arrangement whereby the binary information may be displayed in permanent and easily readable form.

One possible solution of this problem is to make use of bi-stable devices or flip-flops which are sometimes also known as toggle circuits and will be so referred to hereinafter. They may be of the well-known Eccles-Jordan type. Such a toggle circuit is provided for each storage element or bit concerned and the toggles are arranged to control suitable display equipment, for instance individual cold cathode gas discharge tubes. It is also necessary to provide some sort of distributor or counter to render the toggles successively operative and this may add appreciably to the size and cost of the equipment. The chief object of the invention is to provide a more economical arrangement on these general lines whereby display of stored information can readily be effected with a minimum of equipment and a minimum of electrical connections to the drum assembly. It will be appreciated that the display equipment can also be used for checking control waveforms which, although similar to the output of a drum reading circuit, are not actually obtained from the drum but may be employed for controlling its operation.

According to one feature of the invention, in an arrangement for securing a visual display of a plurality of items of information recorded in binary form on a storage device such as a magnetic drum or of a waveform corresponding to the output derived from said storage device, the output or waveform is fed to a series of toggles corresponding in number to the number of items and connected to operate as a shift register, the operation being initiated by a control pulse which operates a gating toggle which is reset by the last toggle of the shift register when it is operated by the control pulse arriving thereat, each toggle of the shift register being arranged in one state to supply potential to effect the operation of a visual indicating device.

With the arrangement suggested above, the number of toggles required is still quite high if display is to be provided for any considerable number of bits but appreciable further economy can be secured by arranging for the shift register to be shared.

According to another feature of the invention, in an arrangement for securing a visual display of a plurality of items of information recorded in binary form on a storage device such as a magnetic drum or of a waveform corresponding to the output derived from said storage device, a plurality of toggles connected to operate as a shift register are arranged to be associated in turn with different portions of the output or waveform and to be set in accordance therewith, the setting of the toggles being transferred to visual indicating devices before they are associated with a different portion of the record. In these circumstances, the number of display toggles required is only the appropriate fraction of the number of elements for which display is provided and only a few further toggles are required to bring into effect the sharing operation.

Figure 3:
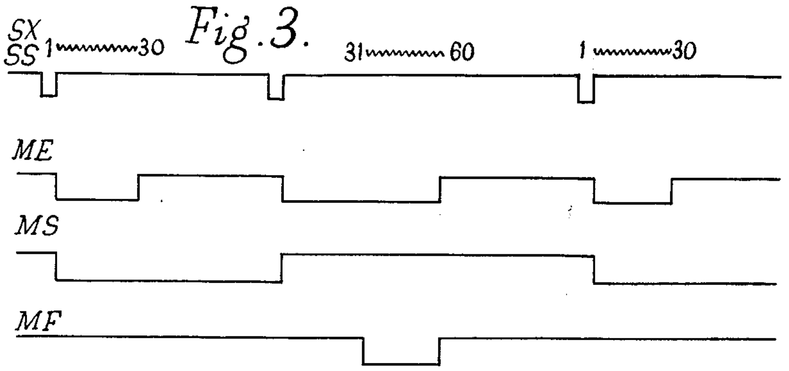
Figure 2:
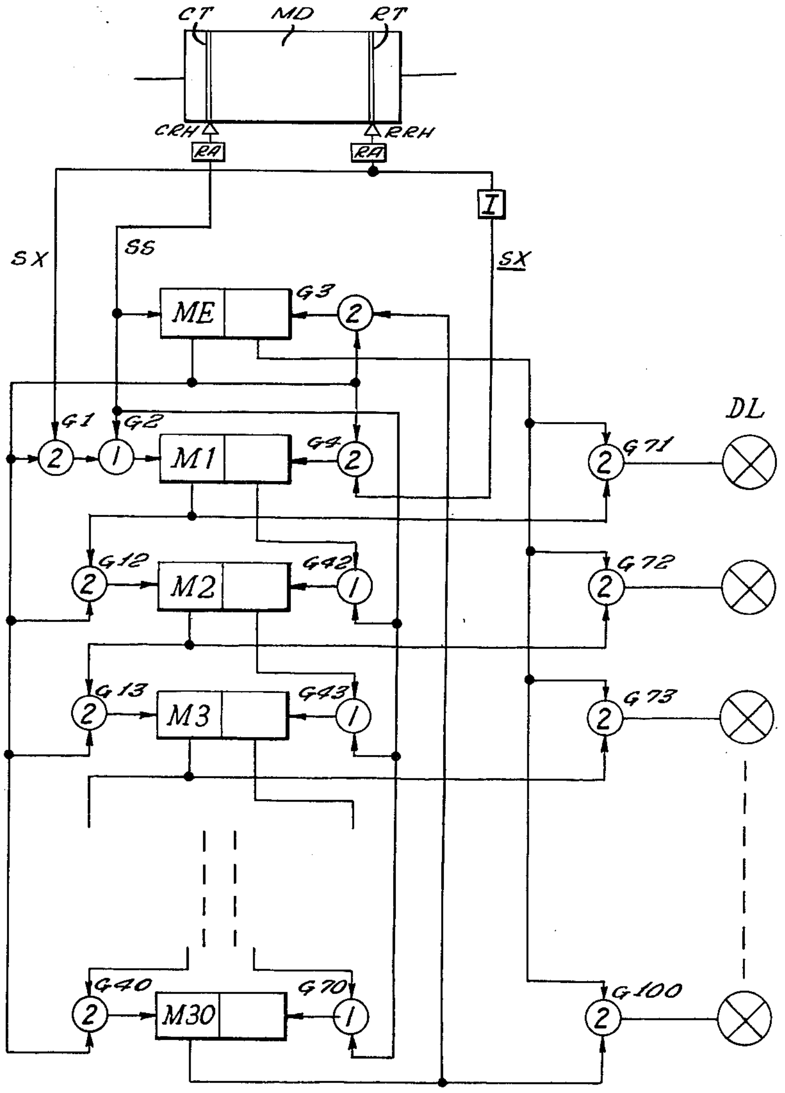
Figure 4:
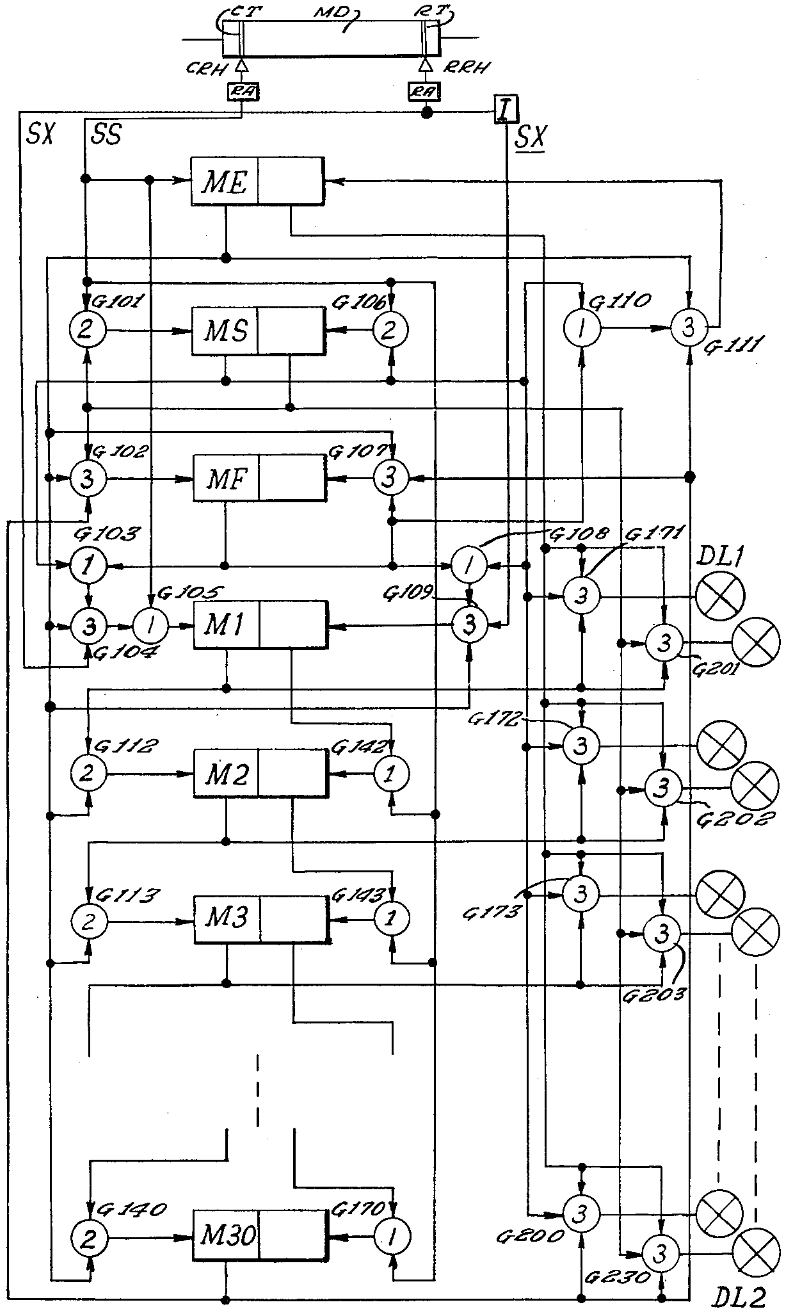
Figure 5:
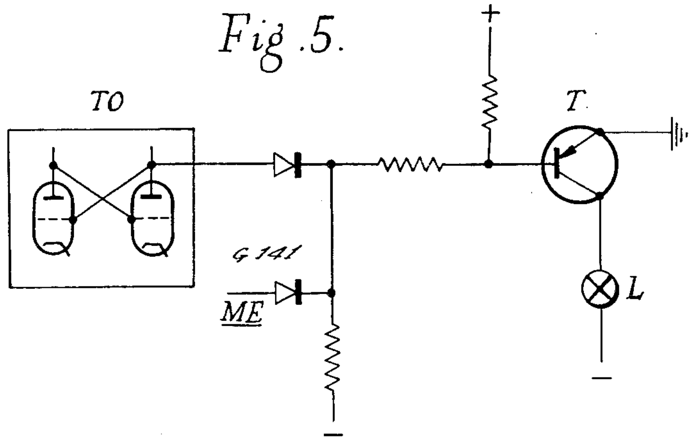
Figure 6:
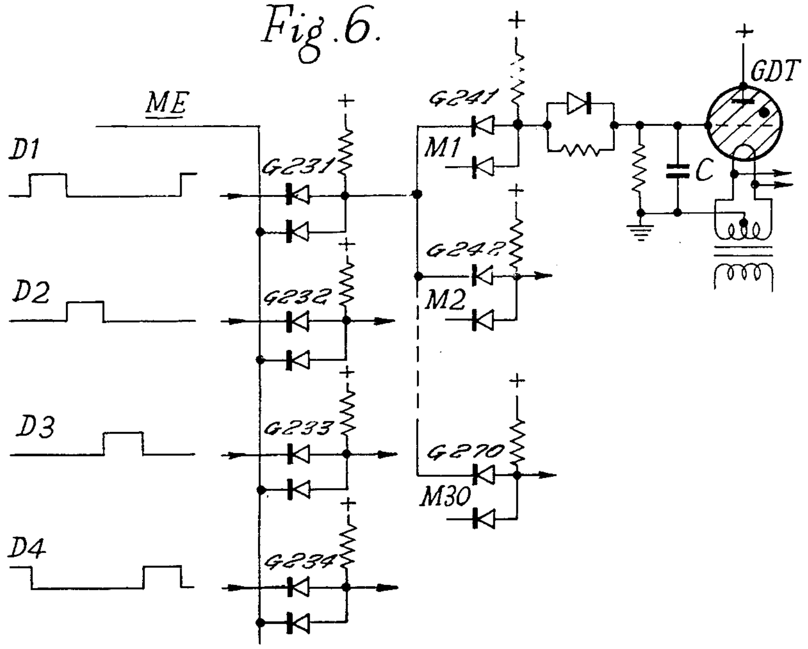

The invention will be better understood from the following description of various methods of carrying it into effect which should be taken in conjunction with the accompanying drawings comprising FIGURES 1–6. FIGURE 1 shows the various waveforms which are assumed to be employed and the condition of the different toggles; FIGURE 2 shows diagrammatically in conventional manner suitable circuits for operating the various toggles and controlling the indicating lamps or other display members; FIGURE 3 indicates one arrangement of waveforms and toggle operation states for giving two-way sharing of the shift register toggles; FIGURE 4 shows conventionally suitable circuits for controlling two-way sharing on this basis; FIGURE 5 shows how a filament lamp of conventional type may be controlled from any one of the toggles M1–M30 to give the required display; and FIGURE 6 shows a suitable circuit using gas discharge tubes for the display on the assumption that four-way sharing is employed.

Considering first FIGURE 1, it will be assumed that the waveform in question is being obtained from a magnetic drum. The waveform SS indicates the incidence of a start pulse which lasts for a duration of one element and occurs immediately before the reading head traverses the section of track for which display is required. This pulse may conveniently be derived from a clock track and be made available only in response to the operation of a display key. SX indicates a typical reading head output after it has been squared by known circuitry and it will be seen that a 0 is represented by one value of the output waveform and a 1 by a more negative value. TS1 represents the usual strobe pulse waveform for controlling the operation of a magnetic drum, namely narrow pulses occurring at the end of the traverse of each element. If these strobe pulses are gated by the start pulse SS and the control toggle ME, which may be convenient if a number of displays are required, the waveform TSG shown at the bottom of FIGURE 1 is obtained. As may be gathered from the showing of the SX waveform, it is assumed that 30 elements are to be dealt with without sharing and hence 30 display toggles M1–M30 are provided in addition to the control or gating toggle ME. FIGURE 1 illustrates successive operations of the various toggles and it will be appreciated that at the end of the traverse of the 30 elements past the reading head, the state of the first toggle M1 will correspond to the condition of the storage element last encountered, marked (30) in FIGURE 1, and the other toggles will correspond to successive elements in turn, i.e. M2 will correspond to (2), M3 to (28) and so on. The original 1 in position (1) of SX will have passed completely through the shift register and will appear in the setting of M30. These positions are indicated by 0's and 1's on the right-hand side of FIG- URE 1. In order to prevent confusion due to flashing of the lamps while the shift register is being set, the resetting of ME will preferably be arranged to control the display on the indicator, which may be of the type shown in FIGURE 5 or FIGURE 6.

The circuits to bring about the various changes will now be described with reference to FIGURE 2, use being made of the conventional notation. It will be assumed that the waveform is obtained from a magnetic drum MD which is of conveniently cylindrical form and is arranged to be driven at a substantially constant speed by an electric motor or other suitable device. The information to be displayed is assumed to be recorded in a register track RT which co-operates with a register read head RRH. The drum also carries a so-called clock track CT containing a marking which provides the start pulse when encountered by the reading head CRH. The output of the head CRH is extended over the reading amplifier RA to lead SS, while the output of head RRH extends from a corresponding reading amplifier RA to lead SX and also to an inverter I from which the inverse output $\underline{SX}$ is obtained. In FIG. 2 the toggles are represented by divided rectangles with set input applied from the left and reset input from the right. Set output extends from the bottom on the left and reset output similarly from the bottom on the right. If a gated strobe is to be used, this may be represented by:

(SS+ME)·TS1–TSG

This strobe is not indicated in FIGURE 2 but it is to be assumed in association with each of the toggles. The start pulse SS serves to set the first toggle M1 over gate G2 and reset the remaining toggles M2–M30 over gates G42–G70 and also operates ME. This may be expressed as:

SS–ME
SS–M1
SS–$\underline{M2}$
. .
. .
. .
SS–$\underline{M30}$

On the next strobe pulse, when the output SX from the reading head RRH and its inverse $\underline{SX}$ are available for the first element, the appropriate setting of toggle M1 is effected over gates G1 and G4 in the circuits:

SX. ME–M1
$\underline{SX}$. ME–$\underline{M1}$

The entry of further pulses to the shift register and transfer down the series then takes place over gates G12–G40 and G42–G70 by means of the circuits:

ME. M1–M2
$\underline{M1}$–$\underline{M2}$

ME. M2–M3
$\underline{M2}$–$\underline{M3}$ and so on down to:

ME. M29–M30
$\underline{M29}$–$\underline{M30}$

This operation continues until the start pulse reaches the end of the shift register when the following circuit is effective over gate G3 to reset the control toggle ME:

ME. M30–$\underline{ME}$

The operation just described is then held up until another start pulse is received and the various toggles have thus been set in accordance with the output which has been picked up. It will be assumed that the operated condition of a toggle corresponds to a 1. On the restoration of the toggle ME, circuits are completed for the display lamps DL over the AND gates G71–G100 gates in cases where the corresponding storage toggle is operated so that the lighted lamps indicate storage of the digit 1 in the corresponding element.

It will be understood that the storage on the drum may be repetitive, that is to say it may occur more than once in one revolution, or there may be only one appearance. The number of start pulses provided will be one for each appearance of the information it is desired to display. With this arrangement the circuits for lighting the lamps are maintained until a further start pulse is received to reset the toggles and hence the lamps are only extinguished while setting is actually taking place.

FIGURE 3 shows one arrangement which may be adopted if sharing of the display toggles is to be used and it is assumed that in this case a total of 60 elements are required to be displayed but that only 30 display toggles are employed together with two additional toggles which are needed to effect the necessary changeover and control and which will be referred to as MS and MF. It is arranged that one or other of the two halves of the display is effective according as toggle MS is or is not operated while toggle MF controls the setting of the shift register for the second operation of the display.

The control circuits are shown in FIGURE 4 and are generally similar to those of FIGURE 2. Toggle MS is directly controlled from the start pulse SS over gates G101 and G106 in the circuits:

SS. MS–$\underline{MS}$
SS. $\underline{MS}$–MS i.e. it is operated by one start pulse and reset by the next. As before, the start pulse operates ME and also M1 over gate G105 in addition resets M2–M30 over gates G142–G170 in circuits similar to those previously given. The control of the initial display toggle M1 from the stored information is in this case effected over gates G103, G104 and G105 in the circuit:

SX. ME(MS+MF)–M1 and also over gates G108 and G109 in the circuit:

$\underline{SX}$. ME(MS+MF)–$\underline{M1}$ and the successive members of the shift register are operated in turn as before over gates G112–G140 and G142–G170. When toggle M30 is operated by the start pulse travelling down the shift register on the first setting, a reset circuit for toggle ME is completed over gates G110 and G111.

ME. M30. MS–$\underline{ME}$

ME is again operated by the next start pulse and MS is reset by the circuits referred to above but since in this case M1 is dependent on the operation of either MS or MF, it is not yet operated by the reading head output SX. It is however operated by the start pulse and this passes through the register as on the previous occasion. When the portion of the drum corresponding to the second display is reached, M30 will be operated by the start pulse and MF is then operated over gate G102 in the circuit:

M30. $\underline{MS}$. ME–MF

This permits the setting of M1 by successive elements of the drum and the transfer of this information down the shift register. After another 30 elements have been dealt with, ME is again reset, this time in the circuit:

ME. M.30. MF–$\underline{ME}$ and MF is also reset in a similar circuit:

ME. M30. MF–$\underline{MF}$

The two displays are controlled as before by ME in reset position and also by MS, the appropriate lamps DL1 being lighted as required over gates G171–G200 when MS is operated and the lamps DL2 over gates G201–G230 when MS is not operated. Since in this case the toggles M1–M30 must be restored in readiness for their second setting, the lamps are only lighted for a fraction of the total time and consequently other things being equal the brightness of the display will depend on the number of sets of display lamps which share the control mechanism. One way in which the display may be prolonged is indicated in FIGURE 6 which will be described shortly.

Considering now FIGURE 5, this indicates one method of lighting an ordinary filament lamp, for instance of the telephone switchboard type, from a conventional toggle TO. It will be seen that the control potential is taken from the anode of one of the valves assumed to form the toggle and this is applied to an AND gate G141 together with the reset output of ME. If coincidence occurs, the base of the transistor T is rendered more negative and the transistor conducts, thereby lighting the lamp L. The display in this case is directly dependent on the state of the toggle.

FIGURE 6 shows a possible arrangement using a three-electrode gas discharge tube GDT of the hot cathode type which is triggered into operation by way of its auxiliary electrode but is self-extinguishing. In this case it is assumed by way of example that four-way sharing is employed and that display is controlled by waveforms D1–D4 as indicated on the left of FIGURE 6 having staggered positive-going portions which bring the displays into action successively. These waveforms are applied to AND gates G231–G234, in each case together with the reset output of toggle ME. Thus, for each of the four sets of tubes, operating potential is supplied for a quarter of the total time and this is coincided with the output from the associated toggle M1, M2 . . . M30 over gates G241–G270 so that if this toggle is set, an output is obtained which when applied to the trigger of the corresponding indicator tube GDT causes it to strike. The capacitor C connected between the auxiliary electrode and the cathode serves to prolong the display and also to ensure that the tube is self-extinguishing.

I claim:

1. In a display arrangement for a waveform composed of a predetermined number of elements each corresponding to one or other of two values, a series of bistable devices equal in number to said predetermined number and connected to form a shift register, a gating device for gating the application of said waveform to the first device of said shift register, means for supplying a control pulse to operate said gating device, means for operating the first bi-stable device of said shift register when said waveform corresponds to one of said values, means for suplying regularly repeated control pulses to transfer the operation of said first bi-stable device down the shift register, means for resetting said gating device responsive to the operation of the last of said bi-stable devices forming said shift register, a plurality of visual indicating devices equal in number to said predetermined number and respectively associated with bi-stable devices forming said shift register, and means for operating said indicating devices when the associated bi-stable devices are operated to give a visual indication of the values of said predetermined number of elements in said waveform.

2. In a display arrangement, a magnetic drum, a circumferential track on said drum for recording binary numbers, a reading head co-operating with said track, a plurality of bi-stable devices connected to form a shift register, means for operating the first bi-stable device of said shift register from the output obtained from said reading head when said reading head encounters a record in said track representing one binary number value, means for supplying regularly repeated control pulses to transfer the operation of said first bi-stable device down the shift register, a gating device for gating the output of said reading head, means for supplying a separate control pulse to open said gating device, means for closing said gating device due to the operation of the last bi-stable device of said shift register, a plurality of visual indicating devices respectively associated with said bi-stable devices forming said shift register, and means for operating any one of said indicating devices dependent on the operation of the associated bi-stable device responsive to said reading head encountering a record representing said one binary number value.

3. In a display arrangement, a magnetic drum, a circumferential track on said drum for recording binary numbers, a reading head co-operating with said track, a plurality of bi-stable devices connected to form a shift register, means for operating the first bi-stable device of said shift register from the output obtained from said reading head when said reading head encounters a record in said track representing one binary number value, means for supplying regularly repeated control pulses to transfer the operation of said first bi-stable device down the shift register, a further bi-stable device arranged when in operated position to permit the output of said reading head to be applied to the first bi-stable device of said shift register, means for supplying a separate control pulse to operate said further bi-stable device, means for resetting said further bi-stable device due to the operation of the last bi-stable device of said shift register, a plurality of visual indicating devices respectively associated with said bi-stable devices forming said shift register, means for operating any one of said indicating devices dependent on the operation of the associated bi-stable device responsive to said reading head encountering a record representing said one binary number value, and means for preventing the operation of said indicating devices while said further bi-stable device is operated.

4. In a display arrangement for a waveform composed of a plurality of elements each corresponding to one or other of two values, a plurality of bi-stable devices connected to form a shift register, a plurality of gating devices for gating the application of different portions of said waveform successively to said shift register, means for operating the first device of said shift register when said waveform applied thereto corresponds to one of said values, a plurality of visual indicating devices less in number than said plurality of elements, and means for causing the setting of said shift register devices responsive to one portion of said waveform to be transferred to said indicating devices before the operation of a different gating device effects the association of said shift register devices with a different portion of said waveform.

5. In a display device as claimed in claim 1 a plurality of transistors associated respectively with said bi-stable devices, a similar plurality of lamps respectively associated with said transistors, means controlled by each of said bi-stable devices in one position for applying potential to one electrode of the associated transistor to cause it to conduct, a source of power, and circuit connections including said source of power, said transistors and said lamps to cause any lamp to be lighted when its associated transistor is caused to conduct due to potential applied thereto from the associated bi-stable device.

6. In a display device as claimed in claim 4 a plurality of three-electrode gas discharge tubes respectively associated with said bi-stable devices, means controlled by each of said bi-stable devices in one position for applying potential to the trigger electrode of the associated gas discharge tube, a plurality of capacitors respectively associated with said gas discharge tubes, the capacitor in each case being connected between the trigger electrode and the cathode of the associated tube so as to cause said tube to be extinguished a predetermined time after the removal of said potential from said trigger electrode.

(References on following page)

References Cited by the Examiner

UNITED STATES PATENTS

| | | | |
|---|---|---|---|
| 2,407,320 | 9/1946 | Miller | 235—92 |
| 2,485,825 | 10/1949 | Grosdoff | 235—92 |
| 2,630,550 | 3/1953 | Geokegan | 235—92 |
| 2,679,035 | 5/1954 | Daniels et al. | 340—174 |
| 2,691,100 | 10/1954 | Moody et al. | 235—92 |
| 2,745,006 | 5/1956 | Chu et al. | 235—92 X |
| 2,763,432 | 9/1956 | York | 235—92 |
| 2,792,991 | 5/1957 | Cambio | 235—92 |
| 2,808,535 | 10/1957 | Lee | 235—92 |
| 2,810,099 | 10/1957 | Townsend et al. | 235—92 |
| 2,904,626 | 9/1959 | Rajchman et al. | 340—173 |
| 2,926,339 | 2/1960 | Kramer et al. | 340—174 |
| 2,970,761 | 2/1961 | Beranger | 328—37 X |

FOREIGN PATENTS

| | | |
|---|---|---|
| 799,772 | 8/1958 | Great Britain. |

NEIL C. READ, *Primary Examiner.*

EVERETT R. REYNOLDS, STEPHEN W. CAPELLI, *Examiners.*